(12) United States Patent
Hecht Aguilar et al.

(10) Patent No.: US 10,119,215 B2
(45) Date of Patent: Nov. 6, 2018

(54) SPIN WASH

(71) Applicant: MABE, S.A. DE C.V., Santiago de Queretaro (MX)

(72) Inventors: Martha Carmen Elena Hecht Aguilar, Santiago de Queretaro (MX); Jose Alfredo Ramirez Olvera, Santiago de Queretaro (MX)

(73) Assignee: MABE, S.A. DE C.V., Queretaro (MX)

( * ) Notice: Subject to any disclaimer, the term of this patent is extended or adjusted under 35 U.S.C. 154(b) by 248 days.

(21) Appl. No.: 14/976,494

(22) Filed: Dec. 21, 2015

(65) Prior Publication Data
US 2016/0208426 A1 Jul. 21, 2016

(30) Foreign Application Priority Data
Dec. 19, 2014 (MX) .................... MX/a/2014/016057

(51) Int. Cl.
| | | |
|---|---|---|
| *D06F 23/04* | (2006.01) | |
| *D06F 13/00* | (2006.01) | |
| *D06F 39/08* | (2006.01) | |
| *D06F 35/00* | (2006.01) | |

(52) U.S. Cl.
CPC ............ *D06F 13/00* (2013.01); *D06F 35/006* (2013.01); *D06F 39/083* (2013.01); *D06F 23/04* (2013.01); *Y02B 40/56* (2013.01)

(58) Field of Classification Search
CPC ...................................................... D06F 23/04
See application file for complete search history.

(56) References Cited

U.S. PATENT DOCUMENTS

| | | | | |
|---|---|---|---|---|
| 5,271,251 A * | 12/1993 | Kovich | ................ | D06F 35/006 68/171 |
| 6,668,410 B2 | 12/2003 | Lyu et al. | | |
| 7,017,217 B2 | 3/2006 | Johanski et al. | | |
| 7,263,862 B2 | 9/2007 | Lyu et al. | | |
| 7,376,997 B2 | 5/2008 | Kim et al. | | |
| 2004/0117920 A1* | 6/2004 | Fyvie | ...................... | D06F 43/08 8/158 |
| 2010/0325815 A1* | 12/2010 | Im | .......................... | D06F 33/02 8/159 |

* cited by examiner

*Primary Examiner* — Jason Y Ko
(74) *Attorney, Agent, or Firm* — Terry M. Sanks, Esq.; Beusse Wolter Sanks & Maire, PLLC

(57) ABSTRACT

Embodiments are related to the principles and techniques used in the household appliances industry, particularly it refers to a method for performing routine domestic chores in an easier and optimal manner, more particularly it refers to a textiles washing method by means of spinning intervals in order to achieve an optimal wash with low water consumption.

4 Claims, 1 Drawing Sheet

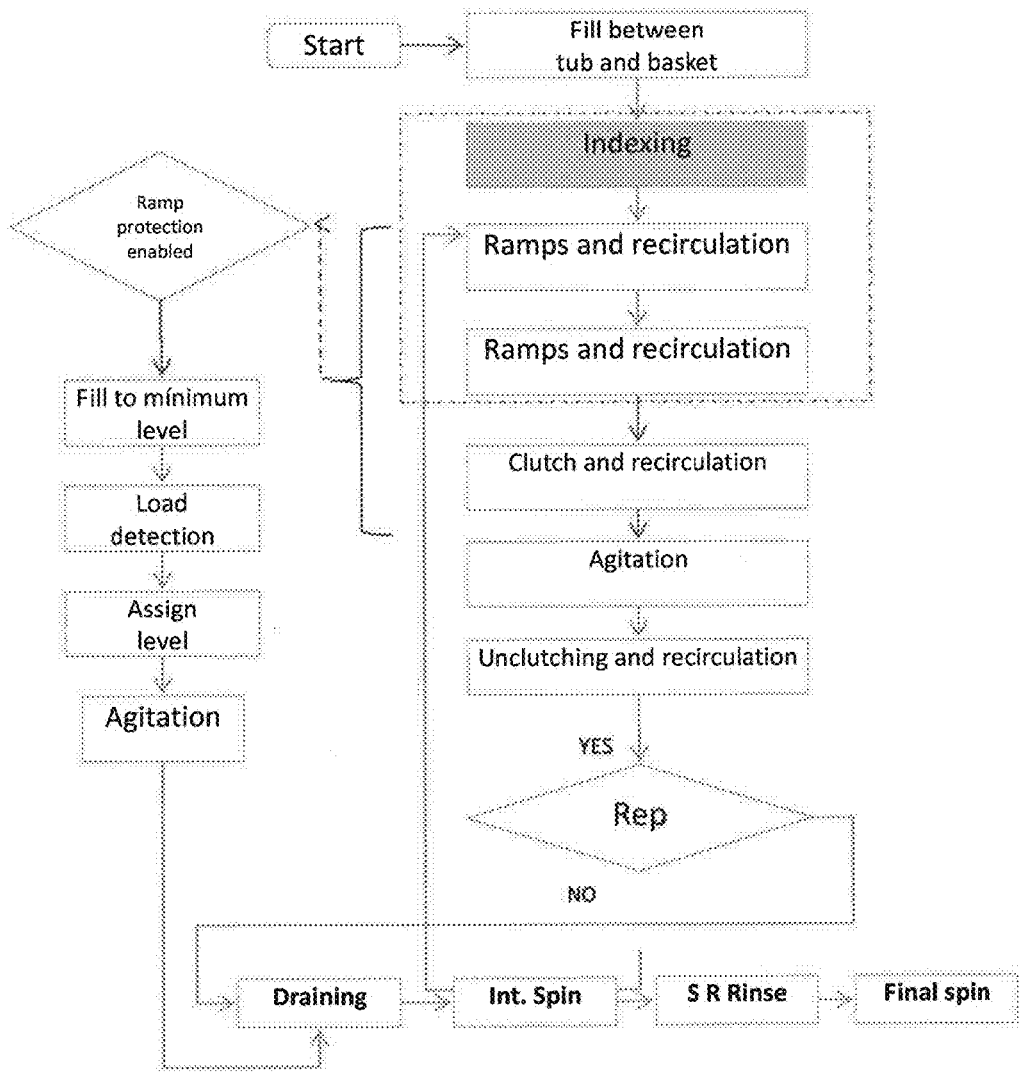

SPIN WASH

FIELD OF THE INVENTION

Embodiments are related to the principles and techniques used in the household appliances industry, particularly it refers to a method for performing routine domestic chores in an easier and optimal manner, more particularly it refers to a textiles washing method by means of spinning intervals in order to achieve an optimal wash with low water consumption.

BACKGROUND

Today in the household appliances industry, the customers' demands for better appliances are increasingly bigger and more demanding, requiring more modern and esthetical designs, which are state-of-the-art and provide an added value, so they allow performing some of the domestic chores in an easier, safe and dependable manner, providing comfort and speed while performing these chores.

Among household appliances, and more particularly white goods, the washing machine is one of the household appliances considered as essential, as it is used for washing clothes, bedding and laundry in general, thus saving time and effort, but above all, what is sought for today is to be increasingly more environment-friendly, mostly saving in the greatest water consumption, using less detergent, optimizing wash cycles and therefore, consuming less power.

Currently, a broad range of washing machines exists, such as industrial, domestic, vertical (top loading), horizontal (front loading), automatic, semiautomatic, manual, drum, driver, agitator, and with spinning, among others.

Depending on the type of washing machine, different washing systems exist, namely:

i) European or front load system, which uses a drum that spins first in one direction carrying the clothes with it, and when they reach the top part, they fall on the water's surface. It pauses briefly for the detergent to act, and restarts the operation in the contrary direction. This continuous action received by the clothes when falling on the water is what finally separates dirtiness. The disadvantage of this system is that it requires longer wash cycles and, therefore, more power consumption.

ii) The American or top-loading system, which uses a central agitator with vanes that moves the clothes within the drum in a back and forth manner, where said agitator, additionally to "agitating" the water, rubs the clothes to separate dirtiness. This system produces a premature wear of the clothes, as the damage to the clothes is greater than in the other systems, additionally to requiring a high water consumption.

iii) Oriental or turbine system, which uses a turbine or pulser which is nothing more than a disc on the bottom of the tub with small vanes that, when rotating in different directions and at a great speed, generate a turbulence in the water, twisting the clothes, moving them up and down and rubbing them against each other and against the vanes and walls of the tub. This washing system is very aggressive for the clothes due to the friction on which this washing system is based in order to remove dirtiness, additionally to requiring a high water consumption.

iv) Infusor washing system, this system is the newest, which uses an infusor that generates water currents which removes the dirtiness in the clothes without need to apply friction between the clothes. The infusion technology washing machines push the water through the sides of the tub towards the center, while the infusor pushes the water towards the tubes walls, where the combination of this actions creates the water pressure that pushes the clothes through the washing machine for cleaning. The infusor operates because the water pressure causes the clothes to rub against each other and move through the water in order to remove the dirt particles with a much smaller amount of water than other systems.

Additionally to the aforementioned, it is well known that conventional automatic washing machines have in common the excessive water consumption, using 120 or more liters in a single load, where water usage is not maximized and a great waste of this precious liquid is generated. Similarly, they use a propeller or agitator system which, due to its form, needs a great amount of water, as they require a high water level in the drum in order perform the washing action. In this way, using a greater amount of water, conventional automatic washing machines achieve an even washing, as the water level is always higher than the level of the load to be washed, due therefore the homogeneity of the load washing is achieved in a somewhat rustic manner, generating an excess in the used water level, which is wasted at the end of the cycle.

Additionally, every washing machine is designed for cleaning textiles in a sequential manner by means of a washing cycle, a rinsing cycle and a spinning cycle. These cycles can be repeated according to the user's selection, the more the cycles are repeated, better cleaning of said textiles is obtained, having as a disadvantage the excessive water usage in order to obtain better results.

This is the case of the United States Patent Application US2001/0131734 A1, Kim et al., referring to a washing method in which the textiles cleaning is achieved by means of a water current, the manner in which this water current is generated is by spinning an inner tub, in a way such that the contained water rises through a space between the outer and inner tubs and falls into the inner tub on the clothes being washed; and the formation of an agitation water current by means of the rotation of the pulser. The forming of the first agitation water current can be performed several times and the formation of the second agitation water current is performed in the process of formation of the first agitation water current. Nevertheless this system has the disadvantage of continuously using the motor for spinning the tub and the pulser for generating the water currents, which generates a greater power consumption, and additionally the water level must be high in order to perform the current generation process for textile washing.

The U.S. Pat. No. 7,263,862 B2, Lyu, et al., describes a method by agitation washing generated by the inner tub and a pulser's rotation movement in the same direction at the same speed, where subsequently in a first time period an inner tub and the pulser rotate in a first direction and where in a second predetermined time period they rotate in a second direction opposed to the first direction. These movements force or push the textiles against an inner tub's wall and force the wash water in the inner tub to pass through the textiles and subsequently pass through the holes provided towards the outer tub, and to flow upwards through a space provided between the inner tub and the outer tub in a manner such that the water is recirculated into the inner tub. Nevertheless, this washing method rotates the inner tub and the pulser always in the same direction.

In turn, the U.S. Pat. No. 7,376,997 B2 describes a rinsing control method for a washing machine with a smaller amount of wash water, by means of the movement or rotation of the inner tub at a relatively high speed. Additionally, the rotation direction of the inner tub in the different wash steps of this patent can be contrary to the rotation direction of the first stage. Additionally, this invention includes a stage in which water is stored in the outer tub and at the same time rinsing or bleaching water is continuously supplied. As described by this patent, the washing of the textiles is performed by means of centrifugations generated by rotary movements of the inner tub.

Additionally, the U.S. Pat. No. 7,017,217 B2 describes a method of the washing machine rinsing cycle, which comprises the rotation of a tub at a first rotation speed, while water is sprayed into the tub, where a sufficient water level is reached according to the textiles quantity; it starts spinning at a second speed, which is higher than the first. In this patent, an oscillatory motion is generated by means of an agitator in order to achieve the washing of the textiles, subsequently the rinsing cycle is started, which uses the water rotation or centrifugation for removing the detergent from the textiles in an efficient manner without a conventional immersion rinsing and additional agitation. In this way, the rinsing water recirculation within the tub and the associated energy consumption are avoided.

The U.S. Pat. No. 6,668,410 B2 describes a complete washing method for a washing machine, which comprises the washing, bleaching or rinsing and dehydration cycles where the washing and bleaching cycles are generated by means of the rotation of the inner tub in one direction. In one penetration washing embodiment, when the pulser and the inner tub are rotated at a high speed, a centrifugal force is generated for pushing the clothes in the inner tub against a wall of the inner tub, and for pushing the wash water in the inner tub into the outer tub through the wash holes in the inner tub, when the wash water penetrates through the textiles said washing is generated. When the wash water is pushed out towards the outer tub, the wash water is pumped towards the top part of the outer tub along a space between the inner tub and the outer tube due to centrifugal force, until the wash water hits the tub's cover and is redirected again towards the inner tub. The wash water has an essentially high pressure while passing from the inner to the outer tub caused by the centrifugal force from the inner tub's high speed rotation. This high pressure and the water hitting effect when falling again into the inner tub due to gravity provide the washing. In other embodiment of this invention known as agitation washing, it is provoked by the setting of the rotation speed below a certain level. That is, if the motor rotation speed is adjusted to be comparatively low, the pulser and the inner tub also rotate at a low speed, where the generated centrifugal force will be unable to push the wash water upwards between the inner tub and the outer tub for maintaining a certain level. The textiles descend to the bottom part of the inner tub to be submerged in the wash water. Under these circumstances, the circulation of the wash water caused by the rotation of the inner tub and the pulser make the agitation washing easier.

According to the aforementioned, it is easy to identify and observe a great diversity of machines and methods existing in the state of the art for textiles washing, which generally use vanes or propellers in combination with the drum or tub motion in order to achieve agitation and/or water currents which move the clothes, thus generating the clothes rubbing mechanical action, this mechanical action produces the rubbing or friction between the textile garments additionally to the vanes or propellers, which damages the garments. Therefore, a need still exists in the art for textiles washing processes that do not damage the textiles, use the smallest amount of water in the washing processes and do not consume excessive energy due to the usage of the motors needed in order to achieve the wash tubs rotation needed.

BRIEF DESCRIPTION

It has been found that when the manner in which the scrubbing mechanical action is performed in a washing machine changes, combined with that of rubbing or agitating, the wash water amount can be optimized, moreover, a method has been developed, where by means of intermittent centrifugation with a minimum water amount, at the same time that the wash water is recirculated in order to make it pass over and between the textiles, thus making possible to achieve homogeneity in the cleaning of the textiles and to remove the stains from the clothes, allowing to make an efficient use of water consumption and, additionally, in order to perform the intermittent centrifugation an infusor, an agitator, a propeller or any other means for performing the agitation mechanical function is used.

Therefore, the present washing method has as its main object to achieve efficiency in water and power consumption, optimizing the manner in which the mechanical clothes rubbing action is achieved by means of the centrifugation wash intervals, combined with the wash water recirculation, and additionally, as it was mentioned, the washing method maximizes the care of textile garments.

This washing method has been developed in order to achieve the greatest savings or efficiency in water consumption independently of the textile garments loads, although better results have been observed in medium loads, of less than nine pounds. The wash cycle, in turn, makes possible to maximize the care for the garments with the least water consumption, decreasing water consumption to approximately at least 10% of the wash water of a conventional cycle.

BRIEF DESCRIPTION OF THE DRAWINGS

FIG. 1 illustrates a flowchart of the washing process according to an embodiment disclosed herein.

DETAILED DESCRIPTION OF THE INVENTION

As it was mentioned in the background of the invention section, many washing machines and methods for dirt removal in textile garments exist, nevertheless, all of them present disadvantages regarding high water consumption, or the premature wear achieved in textile garments when rubbed against mechanical parts of the washing machine in order to remove the dirt particles.

Because of this the washing method disclosed herein was developed, which enhances the washing that usually can be performed using a mechanical agitation means, as an infusor, agitator, propeller or any other means to perform the agitation mechanical function, combining characteristics of this kind of washing systems with water recirculation, thus enhancing the washing and the contact with textile garments in order to achieve the removal of dirt particles. This will be achieved by means of intermittent centrifugation and wash water recirculation simultaneously for an efficient cleaning of textile garments. In addition to only needing approximately at least 10% of the wash water conventionally used in a normal cycle, allowing water savings of up to 160 liters per washed clothes load compared to a normal wash cycle, where the tub is filled with water until textile garments are covered.

Normally, not very dirty and small loads submitted to washing in washing machines use a great amount of water, as the washing processes are not designed to work with small loads, therefore the present method allows for the removal of light stains in this kind of loads, while maximizing the care of the clothes with the least water consumption using as an operation principle a centrifugal force passed through water/soap on the textile by means of a recirculation system.

The clothes washing operation according to an embodiment disclosed herein, starts with the washtub filling with a certain water level, the tub's filling can be performed by filtering the water between the tub and the basket or directly on the textile garments; the amount of water will be that sufficient for performing the wash operation. The predetermined water level is determined by the quantity and type of clothes or textiles to be washed. Nevertheless in a preferred embodiment only 10 liters of water are used in the wash cycle. This is normally made by the selection by the user of a specific parameter in an interface that allows its selection. In an alternative embodiment as part of the process, the load sensing can be performed, which consists in determining the type or size of the load, and with this the water level is determined.

Once the clothes and type of cycle are selected, and the needed detergent is added, the water enters the tub and basket or between the tub and basket, in order to proceed to perform an indexing procedure, consisting in moving the basket intermittently while water is being recirculated. This is accomplished turning on and off intermittently the motor which activates the tub's rotation by predetermined time periods, preferably very short on times and long waiting times, preferably turning on in an interval between 200 ms to 4000 ms and turning off in intervals of 200 to 10000 ms, in cycles or repetitions of at least 1 minute. Water is stored between the tub and the basket, activating a means of returning the water directly to the textile garment by means of a hose and a deflector in the cover, the means can be a pump for recirculating water, preferably a top recirculation water relocation system is used, which rises the water from the tub to its top part and returns it to the tub by the top part, said system can also have an aspersion system, although the recirculation systems known in the art can also be used.

Subsequently, the drum can be rotated in order to apply a centrifugal force on the clothes, in rotation gradients or ramps, while the water contained in the tub is recirculated, thus generating a centrifugal force on the textile garments. A first predetermined speed gradient or ramp is selected within a range of 0 to 400 rpm, generating a centrifugal action, while the water contained in the tub is recirculated. The tub's rotation action allows recovering the soapy water or the wash water contained in the garment and recirculating it, injecting it to the washtub again on the same textile garments. This action allows the water with detergent, soap or wash liquor incorporated to clean the textile garments, achieving a squeezing effect, without damaging the textile garments.

Water recirculation creates water currents allowing removing stains and dirt from the textile garments.

Additionally to the first ramp, an additional ramp of equal intensity can be applied and in an alternative embodiment an additional ramp of higher intensity can be applied. The last ramp can be in the range of 0 to 400 rpm, or higher. In one embodiment, the last ramp preferably can be of higher intensity than in the previous ones. The ramp of higher intensity has as its objective to exert a centrifugal force higher than the previous in order to ensure the complete removal of stains, dirt and water retained in textile garments.

The procedure continues after the tub's first speed ramps or gradients, in order to proceed to washing by unclutching the basket's agitation mechanical element and at the same time soapy water or wash water is recirculated on the clothes, in this unclutching process the agitation mechanical element remains static, consequently an embodiment uses short recirculation activation periods and long recirculation shutdown periods. In a preferred embodiment, the recirculation start is carried out in ranges of 2 s to 30 s and shutdown in periods of 3 s to 60 s. This wash process can be repeated several times depending on the duration of the unclutching, preferably it is repeated 4 times.

After these wash periods, an agitation period will be performed by means of the agitation mechanical element in order to agitate the textile garments. Preferably it is performed in a range of rotation of the agitation mechanical element of 100 to 900 degrees to the sides, with a frequency of 10 to 60 movements per minute of the agitation mechanical element. Speeds calculated by the holder of the patent. It is known that the agitation mechanical element causes a water current allowing the cleaning of textiles, reducing the common damage during a normal wash process. Subsequently, an unclutching of the agitation mechanical element can be performed and carry out the water recirculation again. Preferably, six agitation periods by predetermined time intervals are performed, preferably turning on for 2 s to 30 s and turning off for 3 s to 60 s. Once finished, the tub is returned to the indexing position, which can be repeated at least one time and with this the process can be considered as finished. The indexing block can be preset to be repeated a specific number of times, preferably three, where it has been demonstrated that it has given good results for washing textiles without damaging them. In an alternate embodiment, the number of times for repeating the indexing depends on the characteristics of the load, type of clothes and other parameters that the user can predefine or that can be previously configured to achieve a better wash.

This process additionally can be repeated a specific number of times, which can be selected by the user in the interface or be preset according to the initial parameters. Once the wash process is performed or the complete process repetitions are finished, the soapy water or wash water drainage is performed and centrifugation is carried out to squeeze most of the soapy water or wash water from the textiles. Once this is done, the washing of the garments and a conventional centrifugation are performed.

The rinsing of the garments is performed by any kind of known wash, using recirculation.

The present wash cycle has given good results in the cleaning of textiles, as the recirculation used creates soapy water currents that allow cleaning the garment without scrubbing, thus avoiding its wear. Additionally, it has been demonstrated that by the use of recirculation the damage to the garments is very low. As it can be seen in the following table, which shows the values obtained and compared with other previous washing processes, comparing washing characteristics as washability, damage to the garment, water consumption per cycle and power consumption.

By using the method, a brilliance (washability) of at least 86%, which makes this washing process viable for not very dirty loads not greater than 9 pounds, with the tested values. A very low damage to garments as compared to other washing processes has been achieved.

Occasionally, according to the type of detergent, and due to the wash water recirculation, the foam created can allow to achieve a locking effect of the basket, that is, the basket is locked due to the amount of foam present in it, due to surface tension; therefore and additionally as part of the embodiment disclosed herein, the system is provided with a ramp protection to avoid this situation and by these means preventing damage to any component of the washing machine or compromising the users' safety. These ramp protections are enabled when one of the aforementioned events is detected, which sends signals to the processor to stop the environment-friendly procedure of the embodiments disclosed herein. Ramp protection consists in comparing the current speed against a target speed within a predetermined time lapse, wherein if the current speed is less than the target speed the washing procedure shifts from the environment-friendly mode to a normal washing mode.

Any variation or modification can be introduced in the previously describe realizations of the invention, without departing from the scope of the invention, as defined in the following claims. All these modifications and variations are destined to be included within the scope of the following claims and are protected under the same. In order to finish the detailed description, it must be noted that it will be evident for those skilled in the art that many variations and modifications can be made in an embodiments as defined in the following claims. Similarly, it is intended that said variations and modifications are included within the scope of the embodiments disclosed herein as described in the attached claims. Additionally, in the following claims, structures, materials, actions and equivalents of all media or derived functional elements are intended to include any structure, material or action in order to perform its claimed functions.

The invention claimed is:

1. A washing process of a textile load, environment-friendly, with substantial savings of water, in a washing machine of the type comprising a tub, a basket, a textile load agitation mechanical element and a water recirculation system, the process comprising the stages of:
   i) water filling between the basket and tub to a predetermined water level;
   ii) while water is recirculated using the water recirculation system, performing an indexing procedure that consists of moving the basket intermittently, by activating the motor for short periods of time and deactivating the motor for a period of time greater than the activating time;
   iii) rotating the basket so centrifugal force is applied to the textiles within, the rotation is in gradient or ramps, while water is recirculated;
   iv) unclutching the basket agitation mechanical element, so the agitation mechanical elements remain static, while recirculating water intermittently where the shut down recirculating period is longer than the activated recirculating period;
   v) commencing an agitation period;
   vi) repeating step iv) at least one time;
   vii) returning tub to the indexing position and repeating step ii) at least one time;
   viii) draining the washing liqueur from the tub;
   ix) recirculating wash water by means of the recirculation system, while the basket is rotated intermittently;
   x) applying at least one centrifugal force cycle to the basket, while the water recirculation is applied and the textile load agitation's mechanical element is used;
   xi) recirculating water intermittently without using the agitation mechanical element; and
   xii) agitating the textile load with the agitation mechanical element.

2. The washing process of claim 1, wherein the determination of the water level is determined by the quantity and type of clothes and can be achieved by a load sensing process.

3. The washing process of claim 1, wherein the determination of the water level is determined by the quantity and type of clothes and can be achieved by a user selection of a specific parameter in an interface that allows its selection.

4. The washing process of claim 1, wherein the determination of the water level is fixed to 10 liters of water.

* * * * *